United States Patent [19]
Otto et al.

[11] 4,367,400
[45] Jan. 4, 1983

[54] DEVICE FOR AUTOMATIC CONTROL OF ELECTRO-EROSION MACHINE

[76] Inventors: Mark S. Otto, Kirovogradskaya ulitsa, 10, korpus 1, kv. 277; Viktor K. Nastasy, ulitsa Volgina, 23, korpus 1, kv. 48; Abram L. Livshits, Leninsky prospekt, 11, kv. 62, all of Moscow, U.S.S.R.

[21] Appl. No.: 162,747

[22] Filed: Jun. 25, 1980

[51] Int. Cl.³ .............................................. B23P 1/08
[52] U.S. Cl. ............................... 219/69 G; 219/69 C; 219/69 R; 219/69 D; 204/129.6; 204/129.25
[58] Field of Search ................ 219/69 D, 69 C, 69 E, 219/69 S, 69 R, 69 G; 204/129.2, 129.25, 129.6

[56] References Cited
U.S. PATENT DOCUMENTS

| | | | |
|---|---|---|---|
| 3,603,846 | 7/1971 | Toth | 219/69 G |
| 3,699,303 | 10/1972 | Kauffman et al. | 219/69 D |
| 3,816,692 | 6/1974 | Ratmansky | 219/69 C |
| 3,843,864 | 10/1974 | Wohlabaugh | 219/69 G |
| 3,975,607 | 8/1978 | Ullmann | 219/69 D |
| 4,208,256 | 6/1980 | Inoue | 219/69 D |

*Primary Examiner*—M. H. Paschall
*Attorney, Agent, or Firm*—Robert E. Burns; Emmanuel J. Lobato; Bruce L. Adams

[57] ABSTRACT

A device for automatic control of an electro-erosion machine comprises a sensing unit for sensing the impedance of the interelectrode gap and developing a signal proportional to resistance of an interelectrode gap, a reference voltage source, said unit and said source being connected to a drive feeding a tool electrode, a transmitter for determining an a-c component of interelectrode gap resistance connected to the output of the signal separation unit and a circuit for regulating the flow of working fluid, said transmitter being connected to the input of said circuit, while the output of said circuit is coupled to the working member of a mechanical flow regulation system.

32 Claims, 7 Drawing Figures

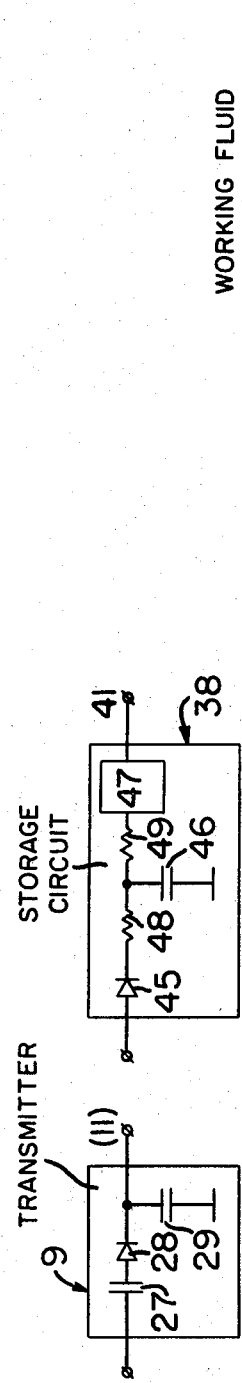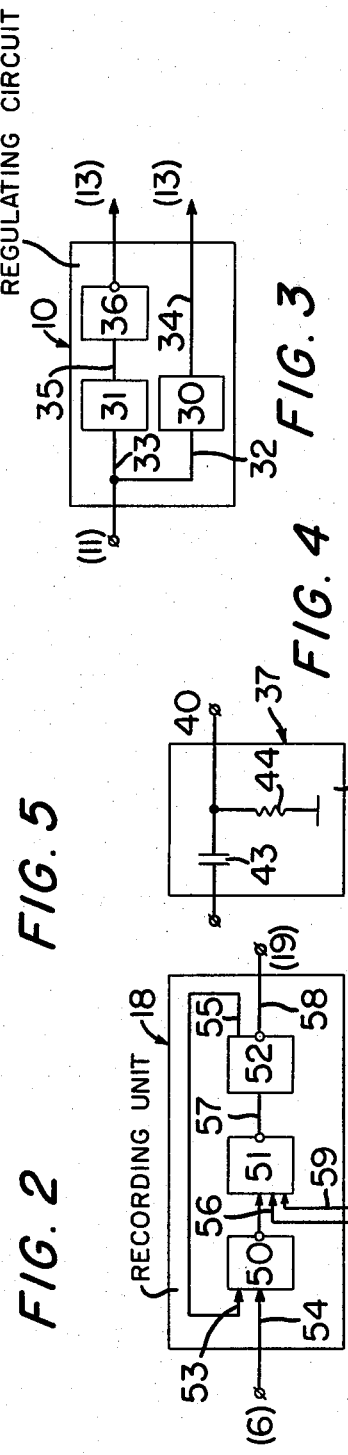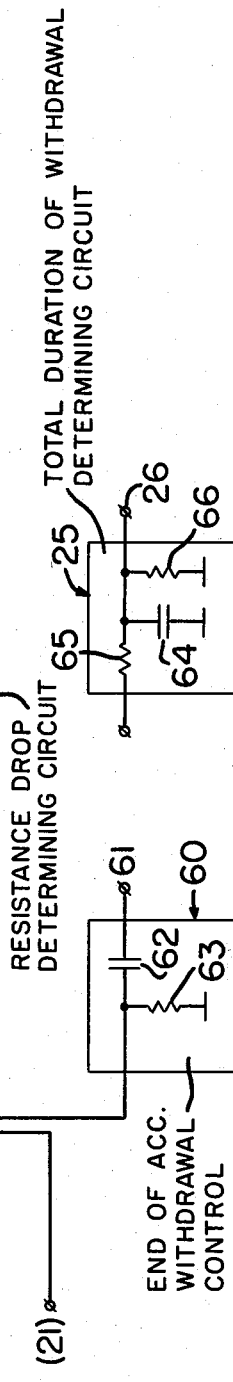

DEVICE FOR AUTOMATIC CONTROL OF ELECTRO-EROSION MACHINE

FIELD OF THE INVENTION

The present invention relates to electro-erosion machining of work pieces and in particular to devices for automatic control of an electro-erosion machine.

The invention may also be used in production of spatially complex-shaped parts, press moulds, stamped pieces and like items.

PRIOR ART

Known in the art is a device for regulating the feed of a tool electrode in electro-erosion machines, which assures regulation by the use of a mean voltage of a generator furnishing pulses for electro-erosion machining (cf. B. G. Gutkin "Automation of Electro-Erosion Machines", Leningrad, "Mashinostroenye" Publishers, 1971, p. 58).

The known device necessitates manual adjustment of the feed of a tool electrode, which is accomplished depending on working conditions and parameters of pulses derived from the output of the pulse generator.

Also known in the art are devices for automatic control of the feed of a tool electrode, which incorporate means for programmed switching of the feed (cf. B. G. Gutkin "Automation of Electro-Erosion Machines", Leningrad, "Mashinostroenye" Publishers, in Russian, 1971, p. 100).

In such devices no account is taken in the feed regulation program of varying working conditions, a disadvantage substantially decreasing production accuracy and efficiency.

There is also known a device for automatic control of the feed of a tool electrode, wherein the feed is controlled by means of pulses supplied from a pulse generator ensuring the minimum of free run pulses and short circuit pulses (cf., A. L. Lifshits et al., "Electro-Pulse Machining of Metals", Moscow, "Mashinostroyenie" Publishers, 1967, p. 175, in Russian).

But, if the frequency of pulses is changed the minimum wear of the tool electrode can only be attained by readjusting the device.

Another known device for automatic control of an electro-erosion machine provided with a generator furnishing pulses for electro-erosion machining and a mechanical system for regulating the flow of working fluid through an interelectrode gap comprises a unit for separating a signal proportional to resistance of the interelectrode gap and a source of reference voltage proportional to the interelectrode gap resistance required to ensure an electro-erosion machining process. The output pulses furnished by the signal separation unit and the reference voltage source are compared and a signal controlling the drive feeding a tool electrode is developed on the basis of comparison results (cf. USSR Inventor's Certificate No. 253,266; Cl. B23K1/00, filed December, 1967, and "Adaptive Control of Electro-Erosion Machines", Moscow, 1977, p. 60).

Thus, the regulator controlling the feed of a tool electrode is automatically adjusted depending on resistance of an interelectrode gap during intervals between generator pulses.

The resistance is measured by the use of a d-c voltage source connected to the electrodes in opposition to the pulse generator through a diode and a resistor.

With such a device, however, the electro-erosion machining process is not fully automatic insofar as such adjustment, in changing machining conditions, cannot always provide for maximum efficiency and minimum wear of the tool electrode. This is due to the fact that the absolute value of optimum resistance during intervals between pulses changes with the interval duration, work area, depth of machining and the flow of working fluid. Besides, in the process of production of a given item, it is necessary to manually adjust the flow of working fluid operating the mechanical system for regulating the flow of working fluid. However, if the working conditions (work area and depth of machining) are varied within wide limits said manual adjustment may not be sufficient to ensure effective elimination of the products of electro-erosion machining. It is, therefore, necessary to utilize short-time accelerated withdrawal and subsequent feed of the tool electrode by the use of a unit for transmitting a signal indicative of movement of the tool electrode, which is done to effectively clean the interelectrode gap (cf. "Adaptive Control of Electro-Erosion Machines", Moscow, 1977, p. 34).

If the tool electrode is to be withdrawn frequently and rapidly for effective elimination of the electro-erosion products the discharge current is brought down by introducing an interval between pulse trains with the aid of an interval adjustment unit.

With the above adjustment techniques the operator experiences certain difficulties in maintaining desired working conditions to ensure high production efficiency and low wear of the tool electrode, a limitation generally resulting in decreased production efficiency and increased wear of the tool electrode. Furthermore, the accuracy of machining work pieces is reduced.

SUMMARY OF THE INVENTION

It is an object of the invention to provide a device for automatic control of an electro-erosion machine, wherein wear of a tool electrode is substantially decreased.

Another object of the invention is to increase stability of an electro-erosion machining process.

A still another object of the invention is to enhance machining accuracy and production efficiency.

The foregoing objects are accomplished by a device for automatic control of an electro-erosion machine provided with a generator furnishing pulses for electro-erosion machining of work pieces and a mechanical system for regulating the flow of working fluid through an interelectrode gap comprising a unit for separating a signal proportional to resistance of the interelectrode gap and a source of reference voltage proportional to the interelectrode gap resistance required to ensure an electro-erosion machining process, said unit and said source interacting with a drive feeding the tool electrode so that the feeding of the tool electrode occurs when the separated signal deviates from the reference voltage, according to the invention, includes a transmitter for determining an a-c component of resistance of the interelectrode gap, said transmitter being connected to the output of the unit for separating a signal proportional to the interelectrode gap resistance, and a circuit for regulating the flow of working fluid through the interelectrode gap, the transmitter for determining the resistance a-c component being electrically connected to the input of said circuit, while the output of said circuit is connected to a working member of the mechanical flow regulation system whereby the flow of working fluid is set to a value at which wear of the tool electrode is reduced to a minimum.

The transmitter for determining the a-c component of the interelectrode gap resistance may incorporate such series-connected components as a differentiating section, a diode and an integrating section, one of the output leads of the diode acting as an output of the transmitter.

Preferably the circuit for regulating the flow of working fluid through the interelectrode gap includes two threshold elements whose inputs are combined and coupled to the output of the transmitter for determining the resistance a-c component, the output of the first threshold element being directly connected to the working member of the mechanical flow regulation system, while the output of the second threshold element is connected to the member through an inverter.

The device for automatic control of an electro-erosion machine having a unit for transmitting a signal indicative of movement of the tool electrode from a work piece at a speed exceeding the work feed to expedite evacuation of electro-erosion products under no-load conditions, said unit being connected to the drive feeding the tool electrode, may also include a unit generating a signal ensuring such a duration of withdrawal of the tool electrode from the work piece, which is proportional to the time of the preceding decrease in the a-c component of the interelectrode gap resistance below a predetermined level, said signal-generating unit being preferably connected via its output to the input of the signal-transmitting unit. Advantageously it includes a circuit for determining a drop of the a-c component of the interelectrode gap resistance and a circuit for storing the duration of said drop, the inputs of the two circuits being coupled to the output of the transmitter for determining the resistance a-c component through a first AND gate, while the outputs of said circuits are coupled through a second AND gate to the input of the unit for transmitting a signal indicative of movement of the tool electrode.

It is advantageous that the device includes a unit for recording the start of working discharges after no-load conditions. The unit is connected via its input to the output of the unit for separating a signal proportional to resistance and via the output thereof to the inputs of the two AND gates and to the input of the unit for transmitting a signal indicative of movement of the tool electrode.

The device may also incorporate a unit for recording the start of working discharges after no-load conditions. This unit is coupled via its input to the output of the unit for separating a signal proportional to resistance and via the output thereof to the inputs of the two AND gates and to the input of the unit for transmitting a signal indicative of movement of the tool electrode, said unit representing a threshold element.

The unit for recording the start of working discharges may also include a flip-flop and two series-connected NOR gates, the inputs of the first gate being respectively connected to the set output of the flip-flop and to the output of the unit for separating a signal proportional to resistance, while the input of the second gate is coupled to the output of the pulse generator, the output of the second NOR gate is connected to the input of the flip-flop, a reset output of the flip-flop acting as the output of the unit for recording the start of working discharges, a unit for determining the end of accelerated withdrawal of the tool electrode being preferably connected to one of the inputs of the second NOR gate, the input of said unit being coupled to the output of the unit for transmitting a signal indicative of movement of the tool electrode, said unit representing a differentiating section.

In the device incorporating, in order to reduce the discharge current and to improve the effectiveness of evacuation of products of electro-erosion machining, a unit for adjusting an interval between pulse trains at the output of the pulse generator, which is connected to the output of the unit for recording the start of working discharges, it is of advantage that a circuit for determining the total duration of withdrawal of the tool electrode exceeding a predetermined value within a specified time period is connected to the interval adjustment unit. The input of this circuit is preferably connected to the unit furnishing a signal proportional to the interelectrode gap resistance, said circuit desirably representing an energy storage capacitor, the specified time period being dependent upon the parameters of a discharging circuit of said capacitor.

Advisably the circuit for storing the duration of a drop of the resistance a-c component incorporates such series-connected components as a diode, an energy storage capacitor, and a threshold element, while the circuit for determining a drop of the resistance a-c component represents an energy storage capacitor.

The device forming the subject of the present invention permits automatic control of the tool-electrode feed, the flow of the working fluid and operation of the pulse generator, that is makes the electro-erosion machining process fully automatic providing high efficiency and minimum wear of the tool electrode.

BRIEF DESCRIPTION OF DRAWINGS

The other objects and advantages of the invention will become apparent from the discussion of specific embodiments thereof, taken in conjunction with the accompanying drawings, wherein:

FIG. 2 illustrates a transmitter for determining an a-c component of resistance of an interelectrode gap according to the invention;

FIG. 3 is a circuit for regulating the flow of working fluid according to the invention;

FIG. 4 is a circuit for determining a drop of resistance a-c component according to the invention;

FIG. 5 illustrates a circuit for storing the duration of a drop of resistance a-c component according to the invention;

FIG. 6 illustrates a unit for recording the start of working discharges according to the invention; and FIG. 7 depicts a circuit for determining total duration of withdrawal of a tool electrode according to the invention.

DESCRIPTION OF THE PREFERRED EMBODIMENTS

Figure 1:
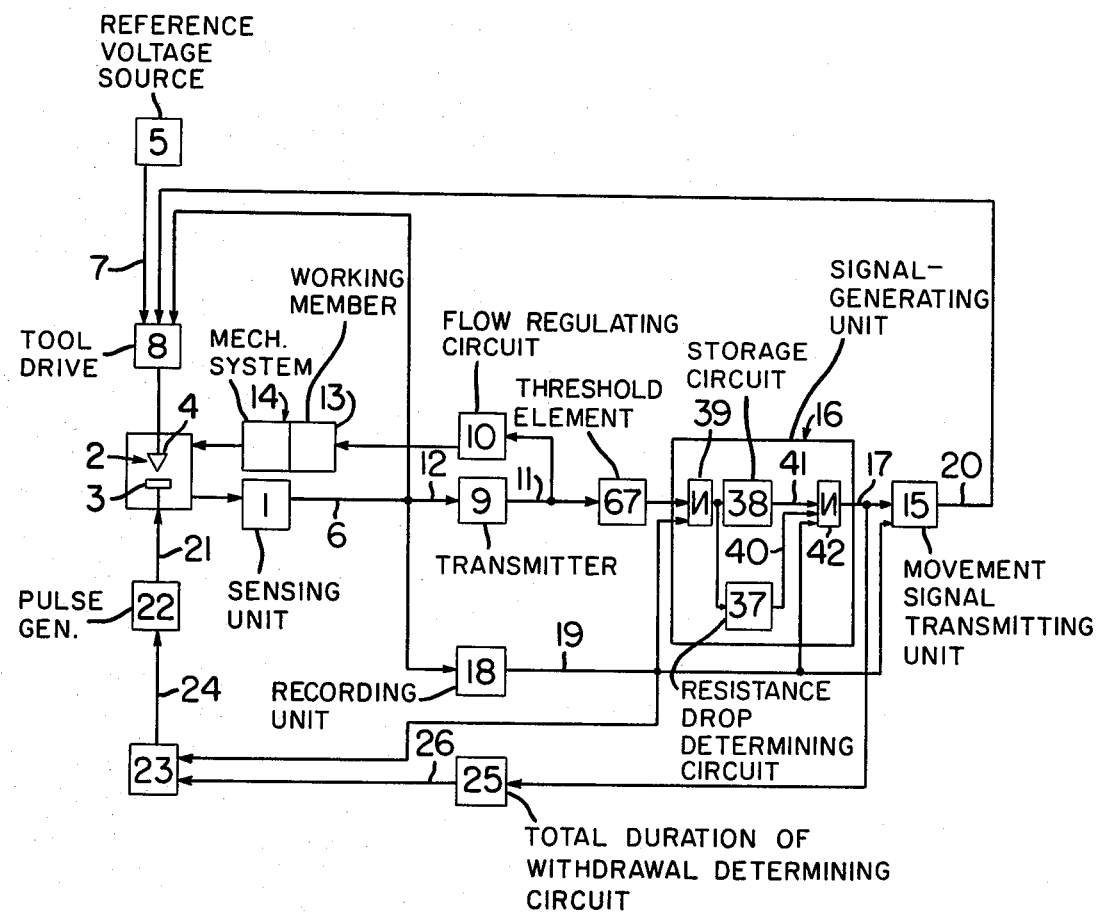
FIG. 1 is a block diagram of a device for automatic control of an electro-erosion machine according to the invention.

The device for automatic control of an electro-erosion machine forming the subject of the present invention comprises a sensing unit 1 (FIG. 1) sensing the impedance of the interelectrode gap and developing a signal proportional to resistance of an interelectrode gap 2 formed by a work-piece 3 and a tool electrode 4 and a source 5 of a reference voltage proportional to the resistance of the interelectrode gap 2 required to ensure an electro-erosion process. Outputs 6 and 7 of the unit 1 and the source 5 are connected to a drive 8 feeding the tool electrode 4. The device also includes a transmitter 9 for determining an a-c component of resistance of the interelectrode gap 2, the transmitter is connected to the output 6 of the unit 1, and a circuit 10 for regulating the flow of working fluid through the interelectrode gap 2. An output 11 of the transmitter 9 is coupled to the input of the circuit 10 whose output 12 is, in its turn, coupled to a working member 13 of a mechanical system 14 for regulating the flow of working fluid through the interelectrode gap 2.

To expedite evacuation of electro-erosion machining products under no-load conditions, the device includes a unit 15 for transmitting a signal indicative of movement of the tool electrode 4 from the work-piece 3 at a speed exceeding the work feed and a unit 16 furnishing a signal providing such a duration of withdrawal of the tool electrode 4 from the work-piece 3 which is proportional to the time of the preceding decrease in the a-c component of resistance of the interelectrode gap 2. An output 17 of the unit 16 is connected to the input of the unit 15, while the input thereof is connected to the output 11 of the transmitter 9 for determining the a-c component.

Besides, the device incorporates a unit 18 for recording the start of working discharges after no-load conditions, the input of said unit is connected to the output 6 of the sensing unit 1, while its output 19 is coupled to the signal-generating unit 16 and to the input of the signal-transmitting unit 15. The drive 8 feeding the tool electrode 4 is connected to an output 20 of the signal-transmitting unit.

In the case of adjusting an interval between pulse trains at an output 21 of a pulse generator 22 furnishing pulses for electro-erosion machining by the use of a unit 23 connected via its output 24 to the pulse generator 22, the device includes a circuit 25 for determining total duration of withdrawal of the tool electrode 4 exceeding a predetermined value within a specified time period. The circuit 25 is connected via its input to the output 17 of the signal-generating unit 16 and via an output 26 thereof to one of the inputs of the unit 23 whose other input is coupled to the output 19 of the unit 18 for recording the start of working pulse discharges.

The transmitter 9 (FIG. 2) for determining the resistance a-c component incorporates such series-connected components as a differentiating section (capacitor 27), a diode 28, and an integrating section (capacitor 29).

The circuit 10 (FIG. 3) for regulating the flow of working fluid is composed of two threshold elements 30 and 31 whose inputs 32 and 33 are combined and connected to the output 11 of the transmitter 9 (FIG. 1). An output 34 (FIG. 3) of the element 30 is directly connected to the working member 13 of the system 14 (FIG. 1), while an output 35 (FIG. 3) of the element 31 is coupled to said member through an inverter 36.

In compliance with the invention the signal-generating unit 16 includes a circuit 37 (FIG. 1) for determining a drop of an a-c component of resistance of the interelectrode gap 2 and a circuit 38 for storing the duration of said drop. The inputs of the circuits 37 and 38 are coupled to the output 11 of the transmitter 9 through an AND gate 39, while outputs 40 and 41 thereof are connected to the input of the unit 15 through an AND gate 42.

The circuit 37 (FIG. 4) includes an energy storage capacitor 43 with a resistor 44 acting as its charging and discharging circuit.

The circuit 38 (FIG. 5) incorporates such series-connected components as a diode 45, an energy storage capacitor 46, and a threshold element 47. The charging and discharging circuit of the capacitor 46 includes a resistor 48 at the output of the diode 45 and a resistor 49 at the input of the threshold element 47.

The unit 18 (FIG. 1) for recording the start of working discharges after no-load conditions may represent a threshold element whose output 19 is coupled to the inputs of the logic gates 39 and 42 (FIG. 3) and to the input of the unit 15.

The unit 18 for recording the start of working discharges may represent a circuit shown in FIG. 6, which incorporates two NOR gates 50 and 51 placed in series and a flip-flop 52. Inputs 53 and 54 of the gate 50 are respectively connected to a set output 55 of the flip-flop 52 and to the output of the sensing unit 1, while an input 56 of the gate 51 may be coupled to the output 21 of the pulse generator 22 (FIG. 1). An output 57 of the gate 51 is connected to the input of the flip-flop 52 whose reset output 58 serves as the output of the entire unit 18.

A unit 60 for determining the end of accelerated withdrawal of the tool electrode is connected to the input of the NOR gate 51, an input 61 of said unit being connected to the output of the unit 15. The unit 60 comprises a differentiating section composed of a capacitor 62 and a resistor 63.

Turning now to FIG. 7 there is shown the circuit 25 for determining total duration of withdrawal of the tool electrode, said circuit incorporating an energy storage capacitor 64 whose charging and discharging circuit is composed of resistors 65 and 66, the specified time period being dependent upon the parameters of said charging and discharging circuit.

The aforesaid threshold elements, AND, NOR and other gates may be based on integrated microcircuits and transistors.

The device for automatic control of an electro-erosion machine forming the subject of the invention operates in the following manner.

After the pulse generator 22 is turned on with no discharges in the interelectrode gap 2 a maximum signal will be present at the output 6 of the sensing unit 1 since the resistance of the interelectrode gap 2 is maximum. No signal is present at the output 11 of the transmitter 9 since the a-c component of resistance of the interelectrode gap 2 is zero. Due to the absence of working discharges a signal is developed at the output 19 of the unit 18, said signal is fed to the input of the unit 15 and from its output 20 to the drive 8 feeding the tool electrode 4. The drive 8 provides accelerated feed of the tool electrode 4. As discharges occur within the interelectrode gap 2, the voltage at the output 6 of the sensing unit 1 decreases and the signal disappears from the output 19 of the unit 18. The signal will appear at the output 19 of the unit 18 as follows. Turning on the generator 22 feeds for a short time a reset signal to the input 56 of the gate 51, the flip-flop 52 is reset developing a signal at its output 58, which is fed to the input of the unit 15. Next, set signals appear at the inputs 53 and 54 of the gate 50. As discharges occur within the interelectrode gap 2, the voltage at the output 6 of the unit 1 decreases and the signal disappears from the output 19 of the unit 18.

This happens because the flip-flop 52 of the unit 18 changes state as the voltage at the output 6 of the sensing unit 1 and at the input 54 of the gate 50 decreases after the discharges occur. The signal is then removed from the output 20 of the unit 15 and the accelerated feed of the tool electrode 4 is stopped.

As the flip-flop 52 changes state, a zero potential will be produced at the input 53 of the gate 50 and no signal will arrive at the input 54 of the flip-flop 52. This is done to prevent the accelerated feed of the tool electrode 4 due to spurious signals from the output 6 of the unit caused by accidental alteration of the presence and absence of discharges.

As a discharge occurs within the interelectrode gap 2, the signal from the output 6 of the unit 1 is compared with the reference voltage of the source 5. If the two values are unequal, the drive 8 receives a signal providing the feed of the tool electrode 4. This will help maintain the voltage furnished by the source 5, which is proportional to the resistance of the interelectrode gap 2 required to ensure a desired electro-erosion machining process. The a-c component of said resistance characterizes the condition of the interelectrode gap 2. So, for example, the amplitude of the a-c component is maximum when the flow of working fluid is high.

The a-c component separated in the transmitter 9 by the use of the capacitor 27 is then applied through the diode 28 to the integrating section representing the capacitor 29. The maximum voltage across the capacitor 29 corresponds to the maximum amplitude of the a-c component of resistance of the interelectrode gap 2.

In the preferred embodiment of the invention a signal is fed by the use of the circuit 10 through its threshold element 31 and the inverter 36 to the input of the mechanical system 14 for regulating the flow of working fluid through the interelectrode gap 2 whereby the fluid flow will be reduced. The flow will decrease until the signal is removed from the output 35 of the threshold element 31.

As the electro-erosion machining process is continued, the tool electrode 4 penetrates the work-piece 3 and the flow of working fluid through the interelectrode gap 2 decreases. In this case, the amplitude of the a-c component of resistance of the interelectrode gap 2 and the voltage at the output 11 of the transmitter 9 will decrease. As a result, the signal developed at the output 34 of the threshold element 30 will be fed to the input of the mechanical system 14 to decrease the flow of working fluid through the interelectrode gap 2.

The flow of working fluid will, thus, be set to an optimum value to suit specific working conditions.

A signal appears at the output of a threshold element 67 if the a-c component at the output 11 of the transmitter 9 continues to decrease as the tool electrode 4 further penetrates the work-piece with the flow of working fluid regulated in the above manner.

In this case, the signal derived from the output of the AND gate 39 of the unit 16 arrives at the input of the circuit 38. The voltage across the capacitor 46 of the circuit 38 will, then, increase depending on the duration of the drop of the a-c component of resistance of the interelectrode gap, the charging of the capacitor 43 of the circuit 37 is used to detect the drop of the a-c component of resistance of the interelectrode gap, whereupon the signal from the output 40 of the circuit 37 is fed to the input of the AND gate 42, thus inhibiting passage of the signal from the output 41 of the circuit 38. The signal will appear at the output 41 of the circuit 38 only if the voltage across the capacitor 46 reaches the operating threshold of the element 47, i.e. if the time at which the a-c component of resistance of the interelectrode gap 2 decreases exceeds the specified time period. This is done to prevent any change in the condition of the device due to accidental short-time drops of the a-c component of resistance of the interelectrode gap 2.

Next, two operating conditions of the circuit are generally possible.

If the voltage at the output 11 of the transmitter 9 increases, the charging of the capacitors 46 and 43 is stopped. A disabling signal applied from the output 40 of the circuit 37 to the input of the AND gate 42 of the unit 16 disappears, while the first input thereof accepts the signal from the output 41 of the circuit 38 until the capacitor 46 is discharged.

Consequently, the signal developed at the output 17 of the unit 16 is fed to the drive 8 feeding the tool electrode 4 whereby accelerated withdrawal of the tool electrode 4 will be ensured. At the same time erosion products are vigourously removed from the interelectrode gap 2 due to which the resistance of the interelectrode gap 2 increases.

The accelerated withdrawal of the tool electrode 4 is stopped after the capacitor 46 is discharged. The signal from the output 19 of the unit 18 causes accelerated feed of the tool electrode 4 with the drive 8 and its subsequent feed in the course of machining.

The signal at the output 19 of the unit 18 providing accelerated feed of the tool electrode 4 is produced due to the fact that a reset signal is fed to an input 59 of the gate 51 from the output of the unit 60 after the signal from the output 17 of the unit 16 disappears. The reset signal resets the flip-flop 52 despite the fact that the input 53 is blocked. A signal causing the accelerated feed appears at the output 58 of the flip-flop 52, while the input 53 of the gate 50 accepts a set signal enabling passage of the signal through the input 54.

As the discharges occur, the accelerated feed will be discontinued in the above manner.

Thus, the duration of the accelerated feed will be proportional to the time of the preceding decrease in the a-c component of resistance of the interelectrode gap below a predetermined level.

If the a-c component of resistance of the interelectrode gap decreases over a period exceeding the time of complete charging of the capacitor 46, a disabling signal from the output 40 of the circuit 37 will not be applied to the input of the AND gate 42 after the capacitor 43 is charged and the unit 16 will develop at its output 17 a signal providing accelerated withdrawal of the tool electrode 4.

The time of complete charging of the capacitors 46 and 43 is set to about 3–5 s. As the a-c component of resistance of the interelectrode gap decreases over the maximum permissible time period, the accelerated withdrawal of the tool electrode 4 will continue for a period proportional to the time of complete charging and discharging of the capacitor 46 of the circuit 38.

Each time the signal providing accelerated withdrawal of the tool electrode 4 appears at the output 17 of the unit 16, it arrives at the input of the circuit 25. The capacitor 64 is charged in accordance with the duration of the signals at the input of the circuit 25. As the capacitor 64 is charged with the input of the circuit 25 accepting said signal, it is discharged through the resistor 66.

If the total duration of the signal at the input of the circuit 25 is so great that the capacitor 64 is charged in spite of its discharging in the absence of any signal at the input of the circuit 25, the unit 23 will transmit a signal to the pulse generator 22 with the result that a maximum interval between the pulse trains is set at its output 21.

After the accelerated withdrawal and the subsequent feed are discontinued, a signal indicative of working discharges will be fed from the output 19 of the unit 18 to the other input of the unit 23. The unit 23 will, then, furnish signals to successively decrease and eliminate the intervals between the pulse trains at the output 21 of the pulse generator 22.

If the signal from the output 26 of the circuit 25 is reapplied when the interval between the pulse trains decreases but is not eliminated, its decrease by the use of the unit 23 is stopped to be resumed after the start of working discharges, which is recorded by the signal at the output 19 of the unit 18.

The charging time of the capacitor 64 of the circuit 25 is set to 3–8 s and its discharging time to 5–10 s.

The time required to decrease the interval from its maximum value to zero is within 15–30 s.

As evacuation difficulties are encountered in the course of penetration of the tool electrode 4 or due to other changes in the working conditions, the following successive operations will be performed: flow regulation, relaxation of the tool electrode, and reduction of the discharging current by introducing appropriate intervals between pulse trains whereby the resistance of the interelectrode gap 2 will be maintained within the specified limits over a minimum time, an advantage providing maximum production efficiency.

In the hereinproposed device the flow of working fluid assures minimum wear of the tool electrode and high machining accuracy.

What is claimed is:

1. In an electro-erosion machining comprising a pulse generator for developing pulses for electro-erosion machining; a tool electrode defining together with a workpiece an interelectrode gap and receiving pulses from said pulse generator; a drive feeding said tool electrode; a mechanical system for regulating flow of working fluid through said interelectrode gap, said system having a working member for changing the flow of the working fluid, and a device for automatic control of an electro-erosion machine, comprising:

a sensing unit for sensing the impedance of the interelectrode gap and developing a signal proportional to resistance of the interelectrode gap, said unit having an input and an output;

a source of a reference voltage proportional to the resistance of said interelectrode gap required to ensure an electro-erosion machining process;

said sensing unit and said reference voltage source coactive with said drive feeding said tool electrode so that the feeding of said tool electrode occurs to enable electro-erosion machining when the signal proportional to the resistance of said interelectrode gap deviates from the reference voltage;

a transmitter for determining an a-c component of the resistance of said interelectrode gap, said transmitter having an input and an output; said input of said transmitter connected to said output of said sensing unit;

a working fluid regulation circuit for regulating the flow of working fluid through said interelectrode gap, the last-mentioned circuit having an input and an output; said input of said working fluid regulation circuit connected to said output of said transmitter for determining the a-c component; said output of said working fluid regulation circuit being coupled to said working member of said mechanical system for regulating the flow of working fluid through said interelectrode gap, whereby the flow of the working fluid is maintained at a value at which wear of said tool electrode is a minimum, and said transmitter for determining the a-c component of the resistance of said interelectrode gap includes series-connected components comprising a differentiating section, a diode, and an integrating section.

2. In an electro-erosion machining comprising a pulse generator for developing pulses for electro-erosion machining; a tool electrode defining together with a workpiece an interelectrode gap and receiving pulses from said pulse generator; a drive feeding said tool electrode; a mechanical system for regulating flow or working fluid through said interelectrode gap, said system having a working member for changing the flow of the working fluid, and a device for automatic control of an electro-erosion machine, comprising:

a sensing unit for sensing the impedance of the interelectrode gap and developing a signal proportional to resistance of the interelectrode gap, said unit having an input and an output;

a source of a reference voltage proportional to the resistance of said interelectrode gap required to ensure an electro-erosion machining process;

said sensing unit and said reference voltage source coactive with said drive feeding said tool electrode so that the feeding of said tool electrode occurs to enable electro-erosion machining when the signal proportional to the resistance of said interelectrode gap deviates from the reference voltage;

a transmitter for determining an a-c component of the resistance of said interelectrode gap, said transmitter having an input and an output; said input of said transmitter connected to said output of said sensing unit;

a working fluid regulation circuit for regulating the flow of working fluid through said interelectrode gap, the last-mentioned circuit having an input and an output; said input of said working fluid regulation circuit connected to said output of said transmitter for determining the a-c component; said output of said working fluid regulation circuit being coupled to said working member of said mechanical system for regulating the flow of working fluid through said interelectrode gap, whereby the flow of the working fluid is maintained at a value at which wear of said tool electrode is a minimum, said circuit for regulating the flow of the working fluid incorporates an inverter having an input and an output, and first and second threshold elements, each having an input and an output; said inputs of said first and second threshold elements combined and coupled to said output of said transmitter for determining the a-c component of the resistance; said output of said first threshold element connected to said working member of said mechanical system for regulating the flow of the working fluid; said output of said second threshold element connected to said input of said inverter; said output of said inverter connected to said working member of said mechanical system for regulating the flow of the working fluid.

3. In an electro-erosion machining comprising a pulse generator for developing pulses for electro-erosion machining; a tool electrode defining together with a workpiece an interelectrode gap and receiving pulses from said pulse generator; a drive feeding said tool electrode; a mechanical system for regulating flow of working fluid through said interelectrode gap, said system having a working member for changing the flow of the working fluid, and a device for automatic control of an electro-erosion machine, comprising:

a sensing unit for sensing the impedance of the interelectrode gap and developing a signal proportional to resistance of the interelectrode gap, said unit having an input and an output;

a source of a reference voltage proportional to the resistance of said interelectrode gap required to ensure an electro-erosion machining process;

said sensing unit and said reference voltage source coactive with said drive feeding said tool electrode so that the feeding of said tool electrode occurs to enable electro-erosion machining when the signal proportional to the resistance of said interelectrode gap deviates from the reference voltage;

a transmitter for determining an a-c component of the resistance of said interelectrode gap, said transmitter having an input and an output; said input of said transmitter connected to said output of said sensing unit;

a working fluid regulation circuit for regulating the flow of working fluid through said interelectrode gap, the last-mentioned circuit having an input and an output; said input of said working fluid regulation circuit connected to said output of said transmitter for determining the a-c component; said output of said working fluid regulation circuit being coupled to said working member of said mechanical system for regulating the flow of working fluid through said interelectrode gap, whereby the flow of the working fluid is maintained at a value at which wear of said tool electrode is a minimum, a signal-transmitting unit for transmitting a signal indicative of movement of the tool electrode from the workpiece at a speed exceeding the work feed providing evacuation of electro-erosion machining products under no-load conditions; said signal-transmitting unit having an output connected to said drive feeding said tool electrode; a signal-generating unit furnishing a signal corresponding to a duration of withdrawal of the tool electrode from the workpiece which is proportional to the time of the preceding decrease in the a-c component of the resistance of the interelectrode gap below a predetermined level, said decrease being caused by impaired evacuation of electro-erosion machining products therefrom; said signal-generating unit having an input and an output; said input of said signal-generating unit being connected to said output of said transmitter for determining the a-c component of the resistance; said output of said signal-generating unit being coupled to said input of said signal-transmitting unit; said signal-generating unit comprising: a circuit for determining a drop of the a-c component of the resistance of said interelectrode gap, the last-mentioned circuit having an input and an output; a storage circuit for storing the duration of the drop of the a-c component of the resistance, said storage circuit having an input and an output; a first AND gate having an input and an output; said input of said first AND gate acting as an input of said signal-generating unit; said output of said first AND gate connected to said inputs of said circuit for determining the drop of the a-c component of the resistance and the storage circuit for storing the duration of said drop; a second AND gate having first and second inputs and an output; said output of the second AND gate serving as an output of said signal-generating unit; said first and second inputs of the second AND gate connected respectively to said outputs of said circuit for determining the drop of the a-c component and said storage circuit for storing the duration of said drop.

4. A device as claimed in claim 1, wherein said circuit for regulating the flow of the working fluid incorporates an inverter having an input and an output and first and second threshold elements, each having an input and an output; said inputs of the first and second threshold elements combined and coupled to said output of said transmitter for determining the a-c component of the resistance; said output of said first threshold element coupled to said working member of said mechanical system for regulating the flow of the working fluid; said output of said second threshold element coupled to said input of said inverter; said output of said inverter connected to said working member of said mechanical system for regulating the flow of the working fluid.

5. A device as claimed in claim 3, wherein said storage circuit for storing the duration of the drop of the a-c component of the resistance comprises series-connected components comprising a diode, an energy storage capacitor, and a threshold element.

6. A device as claimed in claim 3, wherein said circuit for determining the drop of the a-c component of the resistance comprises an energy storage capacitor.

7. A device as claimed in claim 3, which comprises a recording unit for recording the start of working discharges after no-load conditions, said recording unit having an input and an output; said input of said recording unit connected to said output of said sensing unit for sensing the impedance of the interelectrode gap and developing a signal proportional to the resistance of the gap; said output of said recording unit being connected to said second input of said first AND gate, to said second input of said second AND gate and to said input of said signal-transmitting unit for transmitting a signal indicative of movement of said tool electrode.

8. A device as claimed in claim 4, which comprises a signal-transmitting unit for transmitting a signal indicative of movement of the tool electrode from the workpiece at a speed exceeding the work feed providing accelerated evacuation of electro-erosion machining products under no-load conditions; said signal-transmitting unit having an input and an output and connected to said drive feeding said tool electrode; a signal-generating unit providing a duration of withdrawal of the tool electrode from the workpiece which is proportional to the time of the preceding decrease in the a-c component of the resistance of said interelectrode gap below a predetermined level, said decrease being caused by impaired evacuation of electro-erosion machining products therefrom; said signal-generating unit having an input and an output; said input of said signal-generating unit being connected to said output of said transmitter for determining the a-c component of the resistance; said output of said signal-generating unit being connected to said output of said signal-transmitting unit; said signal-generating unit comprising: a circuit for determining a drop of the a-c component of the resistance of the interelectrode gap, the last-mentioned circuit having an input and an output; a storage circuit for storing the duration of the drop of the a-c component of the resistance, said circuit having an input and an output; a first AND gate having an input and an output; said input of said first AND gate serving as an input of said signal-generating unit; said output of said first AND gate coupled to said inputs of said circuit for determining the drop of the a-c component of the resistance and said storage circuit for storing the duration of said drop; a second AND gate having first and second inputs and an output; said output of said second AND gate acting as an output of said signal-generating unit; said first and second inputs of said second AND gate connected respectively to said outputs of said circuit for determining the a-c component drop and said storage circuit for storing the duration of said drop.

9. A device as claimed in claim 7, wherein said unit for recording the start of working discharged after no-load conditions is a threshold element.

10. A device as claimed in claim 7, wherein said recording unit for recording the start of working discharges after no-load conditions incorporates: a flip-flop having an input and reset and set outputs; a first NOR gate having first and second inputs and an output; a second NOR gate having first and second inputs and an output; said first input of said first NOR gate connected to said set output of said flip-flop; said second input of said first NOR gate connected to said output of said sensing unit for separating a signal proportional to the resistance; said output of said first NOR gate coupled to said first input of said second NOR gate; said second input of said second NOR gate connected to said output of said pulse generator; said output of said second NOR gate connected to said input of said flip-flop; said reset output of said flip-flop acting as an output of said unit for recording the start of the working discharges.

11. A device as claimed in claim 7, comprising: an interval-adjusting unit for adjusting an interval between pulse trains at the output of said generator, said unit having first and second inputs and an output connected to said pulse generator, and a circuit for determining total duration of withdrawal of the tool electrode exceeding a predetermined value over a specified time period; said circuit for determining the total duration of withdrawal having an input connected to said output of said signal-generating unit and an output connected to said first input of said interval-adjusting unit for adjusting the interval between the pulse trains; said second input of said interval-adjusting unit connected to said output of said unit for recording the start of the working discharges.

12. A device as claimed in claim 8, comprising a recording unit for recording the start of the working discharges having an input and an output; said input of said recording unit connected to said output of said sensing unit; said output of said recording unit connected to said second input of said first AND gate, to said second input of said second AND gate and to said input of said unit for transmitting a signal indicative of movement of the tool electrode.

13. A device as claimed in claim 8, comprising a unit for adjusting an interval between pulse trains at the output of said pulse generator, said unit having first and second inputs and an output connected to said pulse generator, and a circuit for determining total duration of withdrawal of the tool electrode exceeding a predetermined value over a specified time period; said circuit for determining the total duration of withdrawal of the tool electrode having an input connected to said output of said signal-generating unit and an output connected to said first input of said interval adjusting unit for adjusting the interval between the pulse trains; said second input of said interval-adjusting unit coupled to said output of said unit for recording the start of the working discharges.

14. A device as claimed in claim 11, comprising a unit for determining the end of accelerated feed of the tool electrode, said unit having an input and an output; said input of said unit for determining the accelerated feed of the tool electrode connected to said output of said unit for transmitting a signal indicative of movement of the tool electrode; said first NOR gate having a third input coupled to said output of said unit for determining the end of the accelerated withdrawal of the tool electrode.

15. A device as claimed in claim 11, wherein said circuit for determining the total duration of withdrawal of the tool electrode is an energy storage capacitor having a discharging circuit, the specified time period being dependent upon the parameters of said discharging circuit.

16. A device as claimed in claim 12, comprising a interval adjusting unit for adjusting an interval between pulse trains at the output of said pulse generator, said unit having first and second inputs and an output connected to said pulse generator, and a circuit for determining total duration of withdrawal of the tool electrode exceeding a predetermined value over a specified time period; said circuit for determining the total duration of withdrawal of the tool electrode having an input connected to said output of said signal-generating unit and an output connected to said first input of said interval adjusting unit for adjusting the interval between the pulse trains; said second input of said interval-adjusting unit coupled to said output of said recording unit for recording the start of the working discharges.

17. A device as claimed in claim 12, wherein said recording unit for recording the start of the working discharges after no-load conditions includes: a flip-flop having an input and reset and set outputs; a first NOR gate having first and second inputs and an output; a second NOR gate having first and second inputs and an output; said first input of said first NOR gate connected to said set output of said flip-flop; said second input of said first NOR gate connected to said output of said sensing unit; said output of said first NOR gate connected to said first input of said second NOR gate; said second input of said second NOR gate coupled to said output of said pulse generator; said output of said second NOR gate connected to said input of said flip-flop; said reset output of said flip-flop acting as an output of said recording unit for recording the start of the working discharges.

18. A device as claimed in claim 12, wherein said storage circuit for storing the duration of a drop of the a-c component of the resistance contains such series-connected components as a diode, an energy storage capacitor, and a threshold element.

19. A device as claimed in claim 12, wherein said circuit for determining the drop of the a-c component of the resistance is an energy storage capacitor.

20. A device as claimed in claim 13, wherein said circuit for determining the total duration of withdrawal of the tool electrode is an energy storage capacitor having a discharging circuit, the specified time period being dependent upon the parameters of said discharging circuit.

21. A device as claimed in claim 14, wherein said unit for determining the end of accelerated withdrawal of the tool electrode represents a differentiating section.

22. A device as claimed in claim 16, wherein said circuit for determining the total duration of withdrawal of the tool electrode is an energy storage capacitor with a discharging circuit, the specified time period being dependent upon the parameters of said discharging circuit.

23. A device as claimed in claim 17, comprising a unit for determining the end of accelerated withdrawal of the tool electrode, said unit having an input and an output; said input of said unit for determining the end of accelerated withdrawal of the tool electrode connected to said output of said unit for transmitting a signal indicative of movement of the tool electrode; said first NOR gate having a third input connected to said output of said unit for determining the end of accelerated withdrawal of the tool electrode.

24. A device as claimed in claim 23, wherein said unit for determining the end of accelerated withdrawal of the tool electrode comprises a differentiating section.

25. In an electro-erosion machine comprising a pulse generator having an output developing pulses for electro-erosion machining; a tool electrode forming together with a workpiece an interelectrode gap and accepting pulses from said pulse generator; a drive feeding said tool electrode; a mechanical system for regulating flow of working fluid through said interelectrode gap having a working member for changing the flow of the working fluid, and a device for automatic control of the electro-erosion machine which comprises:

a unit for sensing the impedance of the interelectrode gap and developing a signal proportional to the resistance of said interelectrode gap, said sensing unit having an input and an output;

a source of a reference voltage proportional to the resistance of said interelectrode gap required to ensure a desired electro-erosion machining process;

said sensing unit for developing a signal proportional to the resistance of said interelectrode gap and said reference voltage source interacting with said drive feeding said tool electrode so that the feeding of the tool electrode occurs to enable the electro-erosion machining process when the signal proportional to the resistance of said interelectrode gap deviates from the reference voltage;

a transmitter for determining an a-c component of the resistance of the interelectrode gap, said transmitter having an input and an output; said input of said transmitter connected to said output of said signal sensing unit;

a circuit for regulating flow of working fluid through said interelectrode gap, said circuit having an input and an output; said input of said regulation circuit connected to said output of said transmitter for determining the a-c component of the resistance; said output of said regulation circuit coupled to said working member of said mechanical system for regulating the flow of the working fluid through said interelectrode gap whereby the flow of the working fluid is set to a value at which wear of the tool electrode is minimum;

a unit for transmitting a signal indicative of movement of the tool electrode from the workpiece at a speed exceeding the work feed providing accelerated evacuation of electro-erosion machining products under no-load conditions; said signal-transmitting unit having an input and an output connected to said drive feeding the tool electrode;

a signal-generating unit furnishing a signal corresponding to a duration of withdrawal of the tool electrode from the workpiece which is proportional to the time of the preceding decrease in the a-c component of the resistance of said interelectrode gap below a predetermined level, caused by impaired evacuation of electro-erosion machining products therefrom; said signal-generating unit having an input and an output; said input of said signal-generating unit connected to said output of said transmitter for determining the a-c component of the resistance; said output of said signal-generating unit connected to said input of said signal-transmitting unit;

a recording unit for recording the start of working discharges after no-load conditions, said recording unit having an input and an output; said input of said recording unit connected to said output of said sensing unit said output of said recording unit coupled to said signal-generating and connected to said input of said unit for transmitting a signal indicative of movement of the tool electrode;

an interval-adjusting unit for adjusting an interval between pulse trains at the output of said pulse generator, said unit having first and second inputs and an output connected to said pulse generator;

a circuit for determining total duration of withdrawal of the tool electrode exceeding a predetermined value over a specified time period; said circuit for determining the total duration of withdrawal of the tool electrode having an input connected to said output of said signal-generating unit and an output coupled to said first input of said unit for adjusting the interval between the pulse trains; said second input of said interval-adjusting unit connected to said output of said unit for recording the start of the working discharges;

a unit for determining the end of accelerated withdrawal of the tool electrode, said unit having an input and an output; said input of said unit for determining the end of accelerated withdrawal of the tool electrode connected to said output of said unit for transmitting a signal indicative of movement of the tool electrode; said input of said unit for recording the start of the working discharges connected to said output of said unit for determining the end of accelerated withdrawal of the tool electrode.

26. A device as claimed in claim 25, wherein said transmitter for determining the a-c component of the resistance of said interelectrode gap incorporates such series-connected components as a differentiating section, a diode, and an integrating section.

27. A device as claimed in claim 25, wherein said circuit for regulating the flow of the working fluid includes an inverter having an input and an output and first and second threshold elements, each having an input and an output; said inputs of said first and second threshold elements combined and connected to said output of said transmitter for determining the a-c component of the resistance; said output of said first threshold element connected to said working member of said mechanical system for regulating the flow of the working fluid; said output of said second threshold element connected to said input of said inverter; said output of said inverter connected to said working member of said mechanical system for regulating the flow of the working fluid.

28. A device as claimed in claim 25, wherein said signal-generating unit includes: a circuit for determining a drop of the a-c component of the resistance of said interelectrode gap, said unit having an input and an output; a circuit for storing the duration of said drop of the a-c component of the resistance of said interelectrode gap, said circuit having an input and an output; a first AND gate having an input and an output; said input of said first AND gate acting as as input of said signal-generating unit; said output of said first AND gate connected to said inputs of said circuit for determining the drop of the a-c component of the resistance and said circuit for storing the duration of said drop; a second AND gate having first and second inputs and an output; said output of said second AND gate serving as an output of said signal-generating unit; said first and second inputs of said second AND gate connected respectively to said outputs of said circuit for determining the drop of the a-c component of the resistance and said circuit for storing the duration of said drop.

29. A device as claimed in claim 25, wherein said unit for recording the start of the working discharges after no-load conditions comprises: a flip-flop having an input and reset and set outputs; a first NOR gate having first and second inputs and an output; a second NOR gate having first and second inputs and an output; said first input of said first NOR gate connected to said set output of said flip-flop; said second input of said first NOR gate connected to said output of said sensing unit; said output of said first NOR gate connected to said first input of said second NOR gate; said second input of said second NOR gate connected to said output of said pulse generator; said output of said second NOR gate connected to said input of said flip-flop; said reset output of said flip-flop serving as an output of said unit for recording the start of the working discharges.

30. A device as claimed in claim 25, wherein said circuit for determining the total duration of withdrawal of the tool electrode incorporates an energy storage capacitor having a discharge circuit, the specified time period being dependent upon the parameters of said discharging circuit.

31. A device as claimed in claim 28, wherein said circuit for storing the duration of said drop of the a-c component of the resistance includes such series-connected components as a diode, an energy storage capacitor, and a threshold element.

32. A device as claimed in claim 28, wherein said circuit for determining the drop of the a-c component of the resistance comprises an energy storage capacitor.

* * * * *